Patented Aug. 18, 1936                                    2,051,399

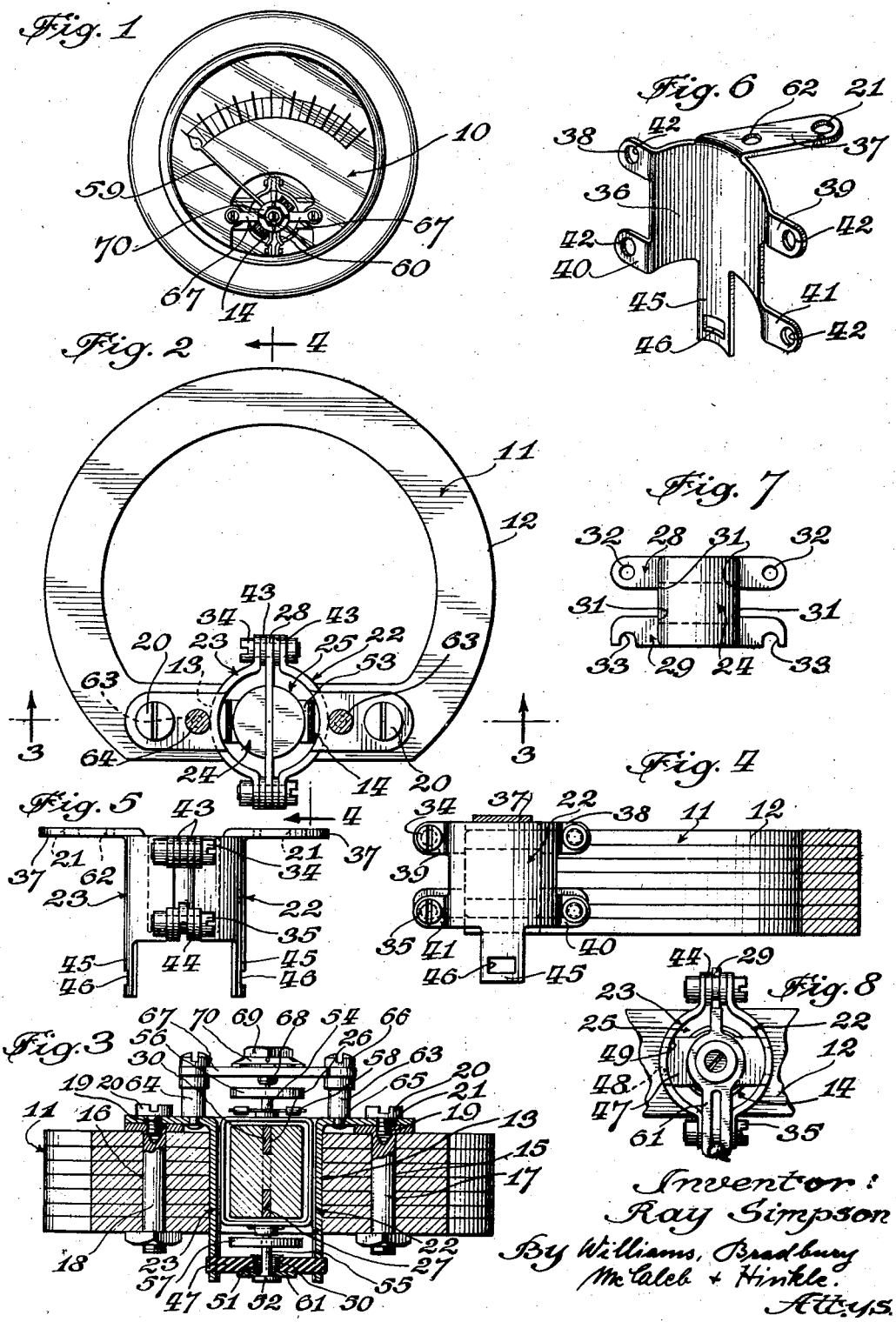

UNITED STATES PATENT OFFICE 2,051,399

ELECTRICAL MEASURING INSTRUMENT

Ray Simpson, River Forest, Ill.

Application August 22, 1935, Serial No. 37,287

11 Claims. (Cl. 171—95)

The present invention relates to electrical measuring instruments of the d'Arsonval type and has for its principal object the provision of an improved magnetic field arrangement which effects a more uniform distribution of the flux and thereby causes the indicating member of the measuring instrument to follow more closely a uniform scale.

Another object of the invention is the provision of an improved structure for an electrical measuring instrument of the class described, which is adapted to be manufactured at a relatively low cost so as to place the instrument within the means of a large number of purchasers, and the provision of a structure which is rugged, easily assembled and adaptable to manufacture with a minimum number of machine operations.

Other objects and advantages of the invention will be apparent from the following description and the accompanying drawing, in which similar characters of reference indicate similar parts throughout the several views.

Referring to the single sheet of drawing:

Fig. 1 is a top plan view of an electrical measuring instrument embodying the present invention;

Fig. 2 is a top plan view of the actuating mechanism with a moving coil in section and the parts above the core removed, showing the details of assembly of the pole pieces;

Fig. 3 is a vertical sectional view, taken on the plane of the line 3—3 of Fig. 2, looking in the direction of the arrows, but with the bridge in elevation;

Fig. 4 is an elevational view in partial section, taken on the plane of the line 4—4 of Fig. 2 showing an elevational view of one of the pole pieces and the laminated magnetic field in section;

Fig. 5 is a side elevational view of the assembled pole pieces;

Fig. 6 is a view in perspective of one of the pole pieces;

Fig. 7 is an elevational view of the core and its fastening devices, and

Fig. 8 is a fragmentary bottom plan view of the movement.

The present invention may be embodied in various kinds of electrical measuring instruments, such as ammeters, volt meters or any other devices employing such a magnetic field structure for a similar purpose. Therefore, the units have not been indicated upon the scale 10 of Fig. 1 since they might be either amperes or volts.

In the devices of the prior art, laminated magnets have included the pole pieces as a part of the magnet itself, the laminations being initially formed by stamping or punching operations and assembled, with the result that the irregularities caused by these methods of manufacture cause an uneven distribution of the magnetic lines of force in the air gap in which the armature rotates. This further causes a non-even scale characteristic.

Uneven distribution of flux in the air gap may also be caused by the lack of accurate alignment of the laminations of the magnet in assembly and by the variations in the hardness of the individual laminations which prevent the armature and pointer from following a scale having uniform divisions.

The devices as constructed according to the present invention are preferably also provided with a magnet indicated in its entirety by the numeral 11, which may be formed of a plurality of laminations 12 of such shape that the ends of the magnet are brought into proximity to each other and are provided with a substantially cylindrical end surface 13 surrounding the moving coil 14. These laminations are punched from sheets of magnetic steel and hardened and provided with transversely extending registering apertures 15, 16 for receiving the assembly bolts 17, 18 which clamp the laminations together.

The assembly bolts 17, 18 are provided in their upper ends with threaded bores 19 for receiving the screw bolts 20 which pass through apertures 21 in the pole pieces 22, 23 to secure the pole pieces in place.

Referring to Fig. 7, this is an elevational view of the magnetic core 24 comprising a substantially cylindrical body of soft magnetic iron which is adapted to be disposed in the space 25 between the pole pieces and inside the moving coil 14. This core 24 is preferably formed with an inwardly extending slot 26, 27 of substantially rectangular shape in section at each end for receiving the securing bars 28, 29. The bars 28, 29 may be formed of brass to prevent the short-circuiting of the magnetic flux thereby, but in some embodiments of the invention it may be found desirable to short-circuit a small amount of flux and in such cases magnetic metal may be used. Each bar has a central portion 30 which is equal in width to the depth of the slots 26, 27, but slightly reduced in width over the remainder of the bars. The bars 28, 29 are, of course, thick enough for a close frictional fit in the slots 26, 27 whereby they are secured therein and they are provided with shoulders 31 at each side of the core so that when the bars 28, 29 are pressed into the slots of the core 24, they are secured in a predetermined position and so located by the shoulders 31.

Bars 28, 29 may be provided respectively with apertures 32 and downwardly extending slots 33, the former being engaged by the securing bolts 34 and the latter hooking over the securing bolts 35 on the pole pieces 22, 23. Each of the pole pieces may be identical in shape and, therefore, only one need be described in detail.

Referring to Fig. 6, each pole piece is preferably constructed by stamping and punching operations out of sheet metal so that it is provided with a partially cylindrical body portion 36, the curvature being concentric to the curvature of the core 24 so that there is an annular space 25 between the core and the pole pieces 22, 23 of substantially uniform width. Each pole piece body preferably has a laterally extending flange 37 at the top, the flange extending to a point above the assembly bolts 17 or 18 to which they may be secured since they are provided with the apertures 21.

Each pole piece is also provided with outwardly extending and diametrically opposite securing flanges 38, 39 at the top and 40, 41 at the bottom, each securing flange having a suitable bolt aperture 42. The opposite flanges 39 of the two pole pieces 22, 23 are secured together by means of bolt 34, the bar 28 of the core being also mounted upon the bolt 34 between flanges 39 and spaced therefrom by spacers 43. The lower bolts 35 may pass through the flanges 41 and through a spool-shaped spacer 44, the body of which is of sufficient size to be received in the slot 33 of bar 29. It should be understood that rivets may be used in place of bolts in any of these cases and particularly in the case of the members 35 so that these members may secure the pole pieces together, the core being inserted afterwards and secured by the bolts 34.

In order to support the jewel for the lower part of the movement, each pole piece body 36 is provided with a downwardly extending strip 45 which may have a substantially rectangular aperture 46. A bar 47 of insulating material, such as fibre board, "bakelite", or other suitable material, has reduced rectangular ends 48 which are a close frictional fit in the rectangular apertures 46. The shoulders 49 on the insulating bar 47 also serve to space the lower parts of the pole piece bodies 36 definitely from each other and to effect a firm securement of the insulating bar or bridge 47 to the pole pieces. The insulating bar 47 is provided with a centrally located aperture 50 having a tubular member such as a rivet 51 secured therein and threaded to receive the lower jewel supporting screw 52.

The moving coil 14 may comprise a multiplicity of turns of extremely fine insulated copper wire mounted upon a light metallic spool 53 which is provided with pivots 54, 55 centrally located at each end of the spool, which is rectangular in elevation. The moving coil is provided with the usual springs 56, 57 at the top and bottom thereof, one end being secured to each spindle and electrically connected with one end of the coil turns, the spindles being insulated from each other. The upper spindle also carries suitable balance arms and weights 58 and pointer 59 and the opposite ends of the springs are secured to spring adjustment arms 60, 61.

The pole pieces 22, 23 are preferably provided with apertures 62 located in the upper flange 37 for supporting the upper bridge posts 63, 64.

Each bridge post may consist of a cylindrical metal member of brass provided with a reduced end 65 which passes through the aperture 62 and is riveted upon the lower side of flange 37. The upper ends of bridge posts 63, 64 have threaded bores for receiving the screw bolts 66 which pass through apertures in the brass bridge bar 67 to secure this bridge bar at each end to a post 63, 64. The bridge 67 has a threaded aperture for receiving upper jewel screw 68. Lock nut 69 clamps spring washer 70 against the spring adjustment arm 60 so as to hold this arm out in predetermined zero adjustment.

It will be noted that the entire pole piece assembly including the upper and lower bridges, core, moving coil, etc., may be assembled as a unit and slid into place between the ends of the laminations of the field 11. Due to the construction of this unit the upper bridge may be used to aid in supporting the pole pieces in predetermined spaced relation to each other and they are also supported in such relation by the bolts 34, 35 with spacers 43, 44. The core 24 is accurately centered with respect to the concentric cylindrical surface of the pole pieces so that the spacing is uniform and as a result of the soft iron pole pieces, the flux distribution across this space is also uniform.

It will thus be observed that I have invented an improved construction in which the various parts may be rigidly mounted to form a movement unit which effects a uniform flux distribution. This results in the uniform movement of the coil with respect to a uniform scale and provides a more accurate meter at a lower cost than the devices of the prior art within a similar cost range. Due to the minimum amount of machine operations involved, the present device may be manufactured at a very low cost, thereby placing it within the means of a larger number of purchasers and benefiting the members of the public who have need of such devices.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an electrical measuring instrument, the combination of a laminated field core forming a magnet with approximately cylindrical adjacent ends, with a pair of pole pieces comprising stamped soft magnetic metal members of semi-cylindrical form oppositely arranged and providing facings for said partially cylindrical surface of said laminations, a measuring instrument movement, and a core disposed between said pole pieces, said soft metal pole pieces effecting a uniform flux distribution between said core and pole pieces in spite of the inequalities of said laminations, whereby the uniform scale characteristic of the movement is improved, said core comprising a substantially cylindrical body of magnetic metal having slots and supporting bars at each end of said core in such slots, said bars being secured to said pole pieces.

2. In an electrical measuring instrument, the combination of a laminated field core forming a magnet with approximately cylindrical adjacent ends, with a pair of pole pieces comprising stamped soft magnetic metal members of semi-cylindrical form oppositely arranged and providing facings for said partially cylindrical surface of said laminations, a measuring instrument movement, and a core disposed between said pole pieces, said soft metal pole pieces effecting a uniform flux distribution between said core and pole pieces in spite of the inequalities of said laminations, whereby the uniform scale characteristic of the movement is improved, said core comprising a substantially cylindrical body of magnetic metal having slots and supporting bars at each end of said core in such slots, said bars being secured to said pole pieces, said bars being slotted at the point of their engagement in the slots of said core to provide shoulders on said bars on each side of said core to effect a definite location of said core.

3. In a pole piece unit, the combination of a pair of stamped sheet metal cylindrical members with a plurality of laterally projecting attaching flanges carried by each member, securing means for fastening said flanges together to form a substantially cylindrical housing, a core of magnetic metal, and a pair of metal members projecting laterally from each end of said core, said metal members engaging said securing means to fix the core concentrically with respect to said pole pieces.

4. In a pole piece unit, the combination of a pair of stamped sheet metal cylindrical members with a plurality of laterally projecting attaching flanges carried by each member, securing means for fastening said flanges together to form a substantially cylindrical housing, a core of magnetic metal, a pair of metal members projecting laterally from each end of said core, said metal members engaging said securing means to fix the core concentrically with respect to said pole pieces, said pole pieces having a pair of axially extending flanges each formed with an aperture, and a bridge of insulating material having reduced ends mounted in said apertures, said bridge providing means for the pivotal support of the movement.

5. In a pole piece unit, the combination of a pair of stamped sheet metal cylindrical members with a plurality of laterally projecting attaching flanges carried by each member, securing means for fastening said flanges together to form a substantially cylindrical housing, a core of magnetic metal, a pair of metal members projecting laterally from each end of said core, said metal members engaging said securing means to fix the core concentrically with respect to said pole pieces, said pole pieces having a pair of axially extending flanges each formed with an aperture, a bridge of insulating material having reduced ends mounted in said apertures, said bridge providing means for the pivotal support of the movement, said pole pieces each having oppositely projecting flanges at one end for engagement with the surface of the field magnet, bridge posts carried by said latter flanges, and a bridge carried by said posts to provide means for pivotally supporting a movement.

6. A pole piece unit assembly comprising a pair of stamped sheet metal pole pieces, each pole piece having a laterally projecting securing flange at each side and at the top and bottom thereof, said securing flanges having apertures, fastening means passing through the apertures of said securing flanges, a core member comprising a substantially cylindrical magnetic member formed with parallel slots at each end, and supporting nonmagnetic metal bars in such slots, said bars being also carried by said securing members.

7. A pole piece unit assembly comprising a pair of stamped sheet metal pole pieces, each pole piece having a laterally projecting securing flange at each side and at the top and bottom thereof, said securing flanges having apertures, fastening means passing through the apertures of said securing flanges, a core member comprising a substantially cylindrical magnetic member formed with parallel slots at each end, and supporting nonmagnetic metal bars in such slots, said bars being also carried by said securing members, each of said bars being formed with shoulders on each side of said core and said bars being frictionally secured in said slots.

8. In a bridge structure for an electrical measuring instrument, the combination of a pair of sheet metal pole pieces, each pole piece having a partially cylindrical flange to effect an equal distribution of flux and having laterally projecting attaching flanges, outwardly projecting posts carried by said attaching flanges, and a bridge strip carried by said posts for supporting a movement bearing, outwardly projecting extensions of said partially cylindrical flanges at the opposite end of said pole pieces, and a transverse strip carried by said latter extensions for supporting the opposite movement bearing.

9. In a bridge structure for an electrical measuring instrument, the combination of a pair of sheet metal pole pieces, each pole piece having a partially cylindrical flange to effect an equal distribution of flux and having laterally projecting attaching flanges, outwardly projecting posts carried by said attaching flanges, and a bridge strip carried by said posts for supporting a movement bearing, outwardly projecting extensions of said partially cylindrical flanges at the opposite end of said pole pieces, and a transverse strip carried by said latter extensions for supporting the opposite movement bearing, one of said strips being formed of insulating material and the second of said strips having its ends secured in apertures in said partially cylindrical extensions.

10. In an electrical measuring instrument, a core comprising a substantially cylindrical metal member of magnetic material, said core having longitudinally extending slots traversing said core at the ends thereof, and a pair of supporting strips secured in said slots and having attaching flanges projecting laterally from said core for supporting said core.

11. In an electrical measuring instrument, a pair of oppositely disposed, partially cylindrical sheet metal pole pieces, a core comprising a substantially cylindrical metal member of magnetic material, said core having longitudinally extending slots traversing said core at the ends thereof, and a pair of supporting strips secured in said slots and having attaching flanges projecting laterally from said core for supporting said core, said attaching flanges being secured between attaching flanges carried by said oppositely disposed partially cylindrical sheet metal pole pieces adapted to effect an equal distribution of flux.

RAY SIMPSON.